United States Patent [19]

Skipper

[11] 4,322,575

[45] Mar. 30, 1982

[54] FLAME RETARDANT COMPOSITIONS

[75] Inventor: Richard S. Skipper, Swindon, England

[73] Assignee: Raychem Limited, London, England

[21] Appl. No.: 94,551

[22] Filed: Nov. 15, 1979

[30] Foreign Application Priority Data

Dec. 13, 1978 [GB] United Kingdom ............. 48227/78

[51] Int. Cl.$^3$ ............... C08K 9/00; H01B 7/00; F16L 9/14; D02G 3/00

[52] U.S. Cl. ................. 174/120 SR; 138/143; 138/145; 138/146; 174/110 V; 174/110 PM; 174/121 A; 174/DIG. 8; 428/375; 428/380; 428/383; 525/222; 524/437; 524/524

[58] Field of Search ............ 260/42.39, 42.46, 45.7 P; 525/222; 138/145, 146, 143, DIG. 1, DIG. 6; 174/DIG. 8, 121 A, 110 PM, 110 V, 110 SR, 120 SR; 428/921, 36, 375, 380, 383

[56] References Cited

U.S. PATENT DOCUMENTS

| | | |
|---|---|---|
| 2,027,962 | 1/1936 | Currie . |
| 3,086,242 | 4/1963 | Cook et al. . |
| 3,433,573 | 3/1969 | Holladay et al. ............ 525/222 |
| 3,539,411 | 10/1970 | Heslop et al. ............ 174/DIG. 8 |
| 3,582,457 | 6/1971 | Barthell ............ 174/DIG. 8 |
| 3,669,824 | 6/1972 | Hess ............ 174/110 PM |
| 3,681,515 | 8/1972 | Mildner ............ 174/110 PM |
| 3,691,120 | 9/1972 | Susuki et al. ............ 260/42.46 |
| 3,741,928 | 6/1973 | Burton ............ 260/42.39 |
| 3,832,326 | 8/1974 | North et al. . |
| 3,860,676 | 1/1975 | Krackeler et al. ............ 525/222 |
| 3,891,410 | 6/1975 | Kuckro et al. ............ 174/110 PM |
| 3,922,442 | 11/1975 | North et al. . |
| 3,957,382 | 5/1976 | Grevel, Jr. et al. ............ 174/DIG. 8 |
| 3,957,382 | 5/1976 | Greuel, Jr. et al. . |
| 4,116,914 | 9/1978 | Coran et al. ............ 525/222 |
| 4,181,775 | 1/1980 | Corke . |
| 4,275,180 | 6/1981 | Clarke . |

FOREIGN PATENT DOCUMENTS

| | | |
|---|---|---|
| 873828 | 6/1971 | Canada . |
| 2808900 | 3/1978 | Fed. Rep. of Germany . |
| 2836322 | 8/1978 | Fed. Rep. of Germany . |
| 7808931 | 10/1927 | France . |
| 1284082 | 8/1972 | United Kingdom . |
| 1337951 | 11/1973 | United Kingdom . |
| 1351840 | 5/1974 | United Kingdom . |
| 1400162 | 7/1975 | United Kingdom . |
| 1431019 | 4/1976 | United Kingdom . |
| 1476456 | 6/1977 | United Kingdom . |
| 1479083 | 7/1977 | United Kingdom . |
| 2016016 | 9/1979 | United Kingdom . |
| 2019412 | 10/1979 | United Kingdom . |
| 1583957 | 2/1981 | United Kingdom . |

OTHER PUBLICATIONS

S. J. Monte & G. Sugerman, *J. Elastomers & Plastics,* vol. 8, (1976), pp. 30-49.

Bulletins KR-0376-4 and KR-0278-7, "Ken-React Titanole Coupling Agents for Filled Polymers," published by Kenrick Petroleum, Inc.

Trade Brochure, "Vynathene Vae Elastomers" for specialty rubber applications . . . an introduction.

*Primary Examiner*—William R. Dixon, Jr.
*Attorney, Agent, or Firm*—Lyon & Lyon

[57] ABSTRACT

The invention concerns a novel cladded elongate substrate such as a jacketed cable, the cladding being flame retarded and comprising a vinyl acetate/alkene copolymer composition incorporating a halogen-free inorganic flame retardant. The composition is characterized by a high content of vinyl acetate and/or the presence of a polyalkene or alkene/alkene copolymer blended with the vinyl acetate/alkene copolymer.

30 Claims, No Drawings

FLAME RETARDANT COMPOSITIONS

The present invention relates to flame retardant compositions and more specifically to cladding for elongate substrates, e.g. electrical insulation for a wire or cable, formed from such compositions.

Accordingly, the present invention provides an elongate substrate provided, over at least a part thereof, with a flame retarded cladding, said cladding being formed from a polymeric composition which comprises a substantially crosslinked blend of a vinyl acetate/alkene copolymer with a further polymer and incorporates an effective amount of a halogen-free inorganic flame retardant, with the provisos that:
  (i) the vinyl acetate/alkene copolymer has a vinyl acetate content of greater than 55 weight percent, or
  (ii) the vinyl acetate/alkene copolymer is blended with a polyalkene or alkene/alkene copolymer and the blend contains less that 66 weight percent vinyl acetate/alkene copolymer, or
  (iii) when the vinyl acetate/alkene copolymer is blended with a polyalkene or alkene/alkene copolymer and the blend contains at least 66 weight percent vinyl acetate/alkene copolymer, then the vinyl acetate/alkene copolymer has a vinyl acetate content of greater than 40 weight percent.

Claddings in accordance with the present invention are found to have a high level of flame retardancy and in addition, the presence of a blend polymer component is found to offer improved properties, e.g. improved physical properties, resistance to solvents, improved flame retardancy and/or lower smoke emission. Thus the presence of an elastomeric or thermoplastic polyalkene or alkene/alkene copolymer is found, e.g. to exhibit improved resistance to solvents. In addition the presence of an elastomeric blend component e.g. elastomeric ethylene copolymers such as EPDM (linear terpolymer based on ethylene propylene diene monomer), styrene/butadiene or hytrel (trade name for a segmented polyester available from Dupont), allows improved physical properties important, e.g. in electrical insulation applications, to be observed. When the blend polymer component is a thermoplastic, then the cladding may be rendered heat-recoverable.

The alkene component of the vinyl acetate/alkene copolymer and the polyalkene, when present, preferably comprises a $C_2$-$C_6$ alkene, particularly an $\alpha$-unsaturated alkene such as ethylene, 1-propylene and 1-butene and particularly ethylene. Alkene/alkene copolymers which may be employed in the compositions of the invention are preferably $C_2$-$C_6$ alkene/$C_2$-$C_{12}$ alkene copolymers, particularly ethylene copolymers with $C_3$-$C_{12}$ alkenes, especially $\alpha$-unsaturated $C_3$-$C_{12}$ alkenes such as n-propyl-1-ene, n-but-1-ene, n-pent-1-ene and n-hex-1-ene. Particularly preferred ethylene copolymers contain greater than 50 weight percent, for example greater than 60 weight percent, more preferably greater than 70 weight percent, for example greater than 85 weight percent, ethylene. Of particular interest are the so-called linear low density ethylene copolymers having a density in the range 0.910 to 0.940 gm/cm$^3$ at 25° C. described in UK patent application No. 7,911,916, and in Canadian Pat. No. 873,828, the disclosure of which is incorporated herein by reference.

In the case where the vinyl acetate/alkene copolymer is employed in the polymeric composition in the absence of a polyalkene or alkene/alkene copolymer as blend component, then preferably the vinyl acetate content of the vinyl acetate/alkene copolymer is up to 95 weight percent, more preferably 60 to 95 weight percent, e.g. 60 to 75 percent, particularly 65 to 95 weight percent, more particularly 65 to 90 weight percent, e.g. 65 to 75 percent, and especially 65 to 85 weight percent, for example 70 to 80 weight percent. In the case where the vinyl acetate/alkene copolymer is employed in the polymeric composition in the presence of a polyalkene or alkene/alkene copolymer blend component, then preferably the vinyl acetate content of the vinyl acetate/alkene copolymer is at least 30 weight percent, more preferably greater than 40 weight percent, for example in the range 45 to 98 weight percent, particularly greater than 55 weight percent, e.g. up to 95 weight percent, especially 65 to 95 weight percent, e.g. 65 to 90 weight percent and more especially 65 to 85 weight percent, for example 70 to 80 weight percent.

The weight ratio of vinyl acetate/alkene copolymer to the polymer blend component e.g. polyalkene or alkene/alkene copolymer, is preferably in the range 1:0.2 to 4, more preferably 1:0.2 to 1.5, or for certain applications 1:1.5 to 4.0 or even 1:2.5 to 4.0.

It is preferred that the overall amount of vinyl acetate in in the polymeric blend is at least 30 weight percent, particularly greater than 40 weight percent, e.g. in the range 65 to 75 weight percent.

Under most circumstances, it may be desirable that the polymeric composition include a coupling agent to improve the compatibility of the flame retardant with the polymeric component(s) of the composition, e.g. to improve the physical properties of the composition. Preferred coupling agents include organo-silicon and titanium derivatives such as silanes and titanates.

As examples of silanes may be mentioned dimethyldichlorosilane, methyl trichlorosilane, vinyl trichlorosilane, $\gamma$-methacryl-oxypropyl-trimethyoxysilane, N, N-bis ($\beta$-hydroxyethyl)-$\gamma$-amine-propyl-triethoxy silane, vinyl propyl-trimethoxysilane, $\gamma$-methacryloxypropyl-trimethoxy silane, $\gamma$-mercaptopropyltrimethoxy silane, vinyl trimethoxy silane, $\gamma$-glycidoxy propyl trimethoxysilane, $\beta$-(3,4-epoxy-cyclohexyl) ethyl trimethyl silane and vinyl trimethoxyethoxysilane. Further appropriate silanes are exmplified in UK Pat. No. 1,284,082.

As examples of titanates and other organo-titanium derivates useful as coupling agents may be mentioned tetraisooctyl titanate, isopropyl diisostearyl methacryl titanate, isopropyltriisostearoyl titanate, isopropyltriacryl titanate, titanium di-(dioctyl pyrophosphate) and especially the so-called hybrid titanates such as isopropyl dimethacryl isostearoyl titanate. Additional suitable titanium compounds are described in S. J. Monte & G. Sugerman, J. Elastomers & Plastics Volume 8 (1976) pages 30-49, and in Bulletins KR 0376-4 and 0278-7 "Ken-React Titanate Coupling Agents for Filled Polymers" published by Kenrich Petrochem Inc, the disclosures of which are incorporated herein by reference. The weight ratio of coupling agent, when employed, to fire retardant preferably lies in the range 0.005 to 0.1:1 respectively, more preferably 0.01 to 0.05:1 respectively.

The preferred flame retardants are those that release water on heating, particularly hydrated aluminium oxides of the formula $Al_2O_3 \cdot xH_2O$, wherein x lies in the range 0.5 to 3 especially $Al_2O_3 \cdot 3H_2O$, ammonium or sodium dawsonite, hydrated magnesia and hydrated calcium silicate, especially α-alumina trihydrates. Flame retardants such as alumina trihydrate preferably have a specific surface area of at least 0.1 m$^2$/g, desirably at least 1 m$^2$/g, e.g. 1 to 80 m$^2$/g, especially 3 to 20 m$^2$/g, as measured by the Brunauer, Emmett and Teller (BET) nitrogen absorption method.

The particle size of the flame retardant is preferably less than 5 microns, and most preferably less than 2 microns. Alternatively or additionally, it may be advantageous to employ a flame retardant comprising a blend of different particle sizes, for example to reduce the melt viscosity of the composition. If desired the flame retardant may be chemically treated, to improve its compatibility with the polymeric material, with one of the above mentioned coupling agents or, in the case of certain flame retardants such as alumina trihydrate, with processing aids such as stearic acid or stearates, e.g. calcium stearate. The flame retardant is preferably used in an amount by weight of from 10 to 400 parts thereof per 100 parts of the polymeric component(s), most preferably from 50 to 200 parts per 100 parts of the polymeric component(s). Notable results have been obtained using an amount of from 80 to 150 parts by weight of the flame retardant per 100 parts of the polymeric component.

Apart from the flame retardant, the composition of the present invention may comprise additional additives, for example fillers, stabilisers such as ultra-violet stabilisers, antioxidants, acid acceptors and anti-hydrolysis stabilisers, foaming agents and colourants, processing aids such as plasticizers, or additional polymers. If additional additives are employed, then it is preferred that the compositions contain less than 5 weight percent halogen in the composition as a whole and more preferably less than 2 weight percent halogen and particularly contain no halogen.

The polymeric compositions may be produced in conventional manner, for example by blending the components thereof in a Banbury mixer. They may then be processed into cladding form, for example by extrusion or moulding, depending on the nature of the cladding and substrate, and simultaneously or subsequently cross-linked.

The polymeric composition may be cross-linked, for example, by the incorporation of a crosslinking agent or by exposure to high energy radiation. Suitable cross-linking agents are free radical initiators such as peroxides for example, dicumyl peroxide, 2,5-bis (t-butyl peroxy)-2,5-dimethylhexane and α,α-bis (t-butyl-peroxy)-di-isopropylbenzene. In a typical chemically cross-linkable composition there will be about 0.5 to 5 weight percent of peroxide based on the weight of the polymeric blend. The cross-linking agent may be employed alone or in association with a co-curing agent such as a poly-functional vinyl or allyl compound, e.g. triallyl cyanurate, triallyl isocyanurate or pentaerithritol tetramethacrylate.

Radiation cross-linking may be effected by exposure to high energy irradiation such as an electron beam or γ-rays. Radiation dosages in the range 2 to 80 Mrads, preferably 2 to 50 Mrads, e.g. 2 to 20 Mrads and particularly 4 to 12 Mrads are in general appropriate. For the purposes of promoting cross-linking during irradiation, preferably from 0.2 to 5 weight percent of a prorad such as a poly-functional vinyl or allyl compound, for example, triallyl cyanurate, triallyl isocyanurate or pentaerithritol tetramethacrylate, are incorporated into the composition prior to irradiation.

The degree of cross-linking of the compositions may be expressed in terms of the gel content (ANSI/ASTM D2765-68) of the cross-linked polymeric composition, i.e. excluding non-polymeric additives that may be present. Preferably the gel content of the cross-linked composition is at least 10%, more preferably at least 20%, e.g. at least 30% more preferably at least 40%.

When it is desired to apply the cladding as a sheath over the length of substrate, it may be convenient to extrude the polymeric composition, prior to cross-linking thereof, directly onto the substrate with simultaneous or subsequent cross-linking.

Alternatively, and particularly when the cladding is intended only to envelop a section of the length of the substrate, it may be convenient to produce the cladding prior to the application thereof to the substrate, for example as a tape or sheet to be wrapped around the substrate or as a sleeve within which the substrate is inserted. When the cladding is produced prior to the application thereof to the substrate, then is preferred that it is produced in dimensionally recoverable form, that is to say, in a form such that the dimensional configuration thereof may be made substantially to change when subjected to appropriate treatment, especially heat-recoverable form, the dimensional configuration of which may be made substantially to change when subjected to heat. The cladding may be rendered heat-recoverable by deformation of the heat-stable configuration thereof in cross-linked form at an appropriate elevated temperature, e.g. at a temperature above the crystalline melting point or softening point of the polymeric composition with subsequent cooling whilst in the deformed configuration, in manner known per se, for example as described in U.S. Pat. Nos. 2,027,962, 3,086,242 and 3,957,382, the disclosures of which are incorporated herein by reference. For heat-shrinkable applications it is preferred that the polymeric composition of the cladding comprises a blend of the vinyl acetate/alkene copolymer with at least one thermoplastic polymer. The weight ratio of vinyl acetate/alkene copolymer to thermoplastic polymer may for example be in the range 1:0.2 to 4, e.g. 1:0.2 to 1.5, particularly 1:0.2 to 0.55. Preferred blend thermoplastic polymers for heat-recoverable applications are the thermoplastic polyalkenes and alkene/alkene copolymers hereinbefore disclosed.

In addition and under certain circumstances, it may be desirable to coat at least a part of the surface of the cladding which is to contact the substrate with a sealant or adhesive, e.g. a hot-melt, heat activatable, pressure sensitive or contact adhesive or a mastic, particularly with a hotmelt adhesive such as disclosed in W. German Offenlegungschrift No. 2,723,116, the disclosure of which is incorporated herein by reference.

One aspect of the present invention of particular interest concerns electrical insulation where extremely stringent non-flammability requirements exist. Examples of the application of the present invention to electrical insulation are primary and secondary wire insulation, cable jackets and wire and cable harness conduits, where the cladding is applied over the length of the substrate, and wire and cable splice covers and terminations in tape, sheet or sleeve form, and cable and harness break-outs in the form of tapes or moulded components, e.g. udders (often referred to as boots), where the cladding is applied only to a section of the length of the wire, cable or harness system.

A further aspect of the present invention of particular interest concerns the sealing or mechanical or environmental protection of pipes or ducts or at least sections thereof, e.g. joints or damaged regions, e.g. in utility supply systems such as gas or water pipes, district heating pipes, ventilation and heating ducts, and conduits or pipes carrying domestic or industrial effluent. One important example of such application is in the jointing of air conditioning or ventilation ducts where the cladding may be employed in the form of a tape or sheet to be wrapped around the joint or a sleeve encompassing the joint, especially in heat-recoverable form.

In the above mentioned uses, the claddings in accordance with the invention are characterised by notably low flammability and smoke and corrosive gas emission under rigorous flammability conditions. Such low flammability characteristics have been found to be directly attributable to the overall level of vinyl acetate in the copolymer of the composition. Further, when compared to analogous compositions having no polyalkene or alkene/alkene copolymer blend component and the same level of vinyl acetate content, claddings formed from compositions including a polyalkene or alkene/alkene blend component are also found to possess a substantial improvement e.g. in their inertness to chemical solvents particularly to oils, their flame retardancy and often their smoke emission under rigorous flammability conditions.

The invention is illustrated by the accompanying Examples, wherein parts and percentages are by weight.

EXAMPLES 1 TO 12

The relevant compositions set out in Table 1 below which shows the parts (approximated to the nearest whole number) of the various constituents, were uniformly blended on a two roll laboratory mill heated to a temperature of 120° to 140° C., compression moulded into plaques at 190° C. and then irradiated under atmospheric conditions with a 5.8 MeV electron beam at the radiation dosages indicated. Samples were subjected to the test methods set out below.

EXAMPLES 13 to 18

The relevant compositions set out in Table 1 were blended in analogous manner to that described in the preceding Examples, the two roll laboratory mill being cooled to prevent sticking and plaques produced therefrom for comparison purposes in the following tests.

TABLE 1

| EXAMPLE NO. | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| DYNH 3 (trade name) low density polyethylene ex Union Carbide | 0 | 0 | 0 | 0 | 30 | 24 | 20 | 16 | 0 | 17 | 14 | 0 | 0 | 0 | 0 | 0 | 0 | 0 |
| Sclair 11-D-1 (trade name) low density polyethylene ex Dupont | 35 | 28 | 27.5 | 22 | 0 | 0 | 0 | 0 | 17 | 0 | 0 | 14 | 0 | 0 | 0 | 0 | 0 | 0 |
| Vynathene EY-907 (trade name) 60% weight vinyl acetate - ethylene copolymer ex USI | 15 | 12 | 0 | 0 | 20 | 16 | 0 | 0 | 33 | 33 | 26 | 26 | 0 | 0 | 0 | 0 | 0 | 0 |
| Vynathene EY-902 (trade name) 40% weight vinyl acetate - ethylene copolymer ex USI | 0 | 0 | 22.5 | 18 | 0 | 0 | 30 | 24 | 0 | 0 | 0 | 0 | 0 | 0 | 40 | 50 | 0 | 0 |
| Elvax 360 (trade name) 75% weight ethylene-vinyl acetate copolymer ex Dupont | 0 | 0 | 0 | 0 | 0 | 0 | 0 | 0 | 0 | 0 | 0 | 0 | 0 | 0 | 0 | 0 | 40 | 50 |
| Elvax 460 (trade name) 82% weight ethylene-vinyl acetate copolymer ex Dupont | 0 | 0 | 0 | 0 | 0 | 0 | 0 | 0 | 0 | 0 | 0 | 0 | 40 | 50 | 0 | 0 | 0 | 0 |
| Alumina Trihydrate (silane coated Hydral 705 (trade name)-available from Alcoa Corp. coated with 1.5% vinyltrimethyoxyethoxysilane | 50 | 60 | 50 | 60 | 50 | 60 | 50 | 60 | 50 | 50 | 60 | 60 | 60 | 50 | 60 | 60 | 60 | 50 |
| Radiation dosage (Mrads) | 6 | 6 | 6 | 6 | 12 | 12 | 12 | 12 | 6 | 12 | 12 | 6 | 12 | 12 | 12 | 12 | 12 | 12 |

Test Methods

The plaques produced in accordance with the preceding Examples were subjected to the following tests.

| | |
|---|---|
| Water resistance measured as % water uptake | ASTM-D-570-77 except that sample disc 25mm in diameter and 1.5mm in thickness is employed. |
| Oil resistance measured as % oil uptake | ASTM-D-570-77 except that sample disc 25mm in diameter and 1.5mm in thickness is employed |
| Tensile strength | BS 903 part A2 |
| Elongation | BS 903 part A2 |
| Flammability measured as limiting oxygen index. | ASTM-D-2863 |
| Smoke emission | measured in an Aminco NBS smoke chamber, in accordance with the Aminco-NBS smoke density chamber catalogue No. J4-5800B, J4-5800BE, instruction 1410 published Nov. 1975 by American Instrument Co. 8030 Georgia Ave. Silver Spring, Maryland 20910. |

The results are set out in Table 2 below and clearly demonstrate inter alia the improved oil resistance of the blends (Examples 1 to 12) when compared to the copolymer in the absence of blend component (Examples 13 to 18), having the same ethylene and vinyl acetate content as the blend, as well as improved flame retardancy and in the majority of cases lower smoke emission.

TABLE 2

| EXAMPLE NO. | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| % Water Uptake | | | | | | | | | | | | | | | | | | |

TABLE 2-continued

| EXAMPLE NO. | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| @ 90° C. | | | | | | | | | | | | | | | | | | |
| 24h | 6.0 | 6.2 | 6.5 | 5.8 | 6.7 | 5.2 | 7.7 | 5.0 | 9.0 | 7.3 | 9.7 | 7.4 | 7.3 | 6.8 | 8.0 | 15.4 | 5.6 | 7.6 |
| 48h | 8.1 | 7.4 | 8.4 | 7.1 | 8.8 | 8.4 | 10.8 | 7.5 | 13.4 | 11.4 | 14.5 | 11.8 | 7.8 | 8.6 | 12.5 | 18.2 | 8.0 | 10.3 |
| % Oil Uptake @ 100° C. ASTM No. 2 (Mineral Oil) | 15 | 14 | 32 | 22 | 20 | 15 | 47 | 25 | 13 | 13 | 27 | 21 | 69 | 100 | 54 | 42 | 42 | 66 |
| Synthetic lubricating Oil British Spec. D. Eng. R.D. 2487 | 15 | 13 | 37 | 23 | 22 | 12 | 37 | 34 | 33 | 29 | 9.7 | 7.4 | 42 | 60 | 80 | 77 | 39 | 56 |
| Tensile Strength (MPa) | 11.6 | 11.8 | 11.8 | 11.8 | 10.8 | 10.5 | 13.1 | 7.5 | 12.1 | 11.2 | 11.1 | 9.9 | 13.3 | 12.0 | 12.0 | 13.5 | 14.5 | 16.3 |
| Elongation (%) | 130 | 100 | 145 | 60 | 74 | 18 | 110 | 25 | 230 | 102 | 168 | 47 | 40 | 85 | 200 | 240 | 70 | 146 |
| Oxygen Index (% $O_2$) | 26.0 | 31.5 | 27.0 | 32.5 | 23.5 | 33.5 | 25.5 | 28.5 | 29.0 | 30.0 | 33.0 | 30.0 | 28.0 | 25.0 | 34.0 | 27.0 | 27.5 | 24.0 |
| $T_{16}$ (min) Flaming Mode | 9.5 | 10 | 8 | 11 | 8 | 9 | 7.3 | 7.3 | 8.5 | 9 | 8.5 | 8.5 | 7 | 6 | 10.5 | 1.5 | 9 | 4 |

EXAMPLE 19

A heat-shrinkable tape was produced from the following formulation:

| Constituent | % |
|---|---|
| *Sclair 11D1 | 17 |
| Vinyl acetate/ethylene copolymer containing 60% vinyl acetate | 33 |
| $Al_2O_3 \cdot 3H_2O$ coated with 1.5% of vinyl trimethoxyethoxy silane | 50 |

The constituents were compounded on a twin roll mill at 120° to 140° C., cooled and pelletised. The pellets so produced were fed to a conventional extruder fitted with a tape die, maintained at 140° C. and extruded into tape 100 mm wide and 1.5 mm thick. The resulting tape was subsequently irradiated with high energy electrons to a total dose of 6 Mrads. After irradiation, the tape was heated to 150° C., expanded lengthwise to 50% of its original length and allowed to cool in this expanded condition. Thereafter the tape was coated with a thin layer (0.5 mm) of a hot-melt adhesive of composition in accordance with W. German Offenlengungshrift No. 2,723,116, Example 3, formulation "0". The physical properties of the tape prior to coating were as follows:

| Tensile Strength (23° C.) | 12.0 MPa |
|---|---|
| Elongation at break (23° C.) | 266% |
| LOI (23° C.) | 29 |
| Tensile Strength (150° C.) | 2.0 MPa |
| Elongation at break (150° C.) | 105% |
| 100% Tangent Modulus (150° C.) | 1.2 MPa |

The heat-shrinkable adhesive coated tape so produced was employed to seal the joint of a 150 mm diameter metal air conditioning duct by pre-heating the duct in the region of the joint, wrapping the tape around the duct over the joint region so that sequential turns of the tape partially overlap and heating the tape with a conventional propane gas torch, so causing the tape to shrink tightly around the joint and causing the adhesive to melt and form a strong adhesive bond between the cladding so formed and the duct substrate.

In a modification, the pelletised material is extruded in the form of a sleeve, which is then rendered radially heat-recoverable and coated with adhesive in analogous manner to that described above. The sleeve so produced is then located about the duct joint and recovered by the application of heat.

EXAMPLES 20, 21 and 22

A formulation comprising 24% by weight of a vinyl acetate/ethylene copolymer, containing 60% copolymerised vinyl acetate and 16% of an elastomer (see below) was compounded with 60% of alumina trihydrate coated with 1.5% thereof of vinyl trimethoxyethoxysilane in an internal mixer of the Banbury type, at a temperature of 130° C. in the case of Examples 20 and 22 and 180° C. in the case of Example 21. After compounding the material on a twin roll mill, the material was removed as a strip, cooled and diced into pellets and lightly talced to prevent blocking of the pellets. The material was then extruded as a cable jacket onto a multi-conductor cable of O.D. 22.5 mm to provide a jacket having a wall thickness of 1.25 mm, using a 3½ inch extruder, 25:1 L/D ratio screw, at temperatures along the barrel of 60°, 80°, 120°, 120°, 130° C. in the case of Examples 20 and 22 and 75°, 90°, 125°, 140°, 165° C. in the case of Example 21 and an extruded die temperature profile of 150°, 140°, 120° C. The jacketed cable was then irradiated with high energy electrons to a total dose of 5 Mrads.

The elastomers employed in the various formulations were as follows:

EXAMPLE 20: EPDM—a linear terpolymer based on ethylene propylenediene monomer.

EXAMPLE 21: Hytrel—tradename for a thermoplastic elastomer polyester derived from dimethyl terephthalate, a polyglycol and a short chain diol, commercially available from Dupont.

EXAMPLE 22: Styrene/butadiene rubber.

The jacketed materials were found to have the following properties:

| | EXAMPLE 20 | EXAMPLE 21 | EXAMPLE 22 |
|---|---|---|---|
| Tensile Strength @ 23° C. (MPa) | 14.0 | 11.5 | 14.7 |
| Elongation at break @ 23° C. (%) | 195 | 240 | 174 |
| Impact Brittleness (per ASTM-D-746) °C. | −30 | −32 | −42 |
| LOI @ 23° C. | 37.6 | 38.8 | 33.2 |

-continued

|  | EXAMPLE 20 | EXAMPLE 21 | EXAMPLE 22 |
|---|---|---|---|
| LOI @ 250° C. | 22.6 | 25.1 | 20.4 |

What is claimed is:

1. An elongate substrate provided, over at least a part thereof, with a flame retarded cladding, said cladding being formed from a halogen-free polymeric composition which comprises a substantially cross-linked blend of a vinyl acetate/alkene copolymer with a styrene/butadiene rubber, or a thermoplastic polyalkene or alkene/alkene copolymer and incorporates an effective amount of a halogen-free inorganic flame retardant which releases water on heating when subjected to the conditions of ASTM-D-2863, with the provisos that:

when the vinyl acetate/alkene copolymer is blended with a styrene/butadiene rubber, the vinyl acetate/alkene copolymer has a vinyl acetate content of greater than 55 weight percent, or when the vinyl acetate/alkene copolymer is blended with a thermoplastic polyalkene or alkene/alkene copolymer and the blend contains less than 66 weight percent vinyl acetate/alkene copolymer, the blend has an overall vinyl acetate content of at least 18 weight percent, or when the vinyl acetate/alkene copolymer is blended with a thermoplastic polyalkene or alkene/alkene copolymer and the blend contains at least 66 weight percent vinyl acetate/alkene copolymer, then the vinyl acetate/alkene copolymer has a vinyl acetate content of greater than 40 weight percent.

2. A cladded substrate according to claim 1 wherein the cladding comprises electrical insulation.

3. A cladded substrate according to claim 2 wherein the substrate comprises a wire, cable or electrical harness.

4. A cladded substrate according to claim 1 wherein the cladding provides a seal or mechanical or environmental protection.

5. A cladded substrate according to claim 4 wherein the substrate comprises a pipe or duct.

6. A cladded substrate according to claim 1 wherein the cladding is located about the substrate by dimensional recovery thereof.

7. A cladded substrate according to claim 1 wherein a sealant or adhesive is interposed between the substrate and cladding.

8. A cladded substrate according to claim 1 wherein the vinyl acetate/alkene copolymer of the cladding has a vinyl acetate content in the range of 60 to 95 weight percent.

9. A cladded substrate according to claim 8 wherein the vinyl acetate/alkene copolymer of the cladding has a vinyl acetate content in the range of 65 to 85 weight percent.

10. A cladded substrate according to claim 1 wherein the vinyl acetate/alkene copolymer is a vinyl acetate/ethylene copolymer.

11. A cladded substrate according to claim 1 wherein the halogen-free inorganic flame retardant is alumina trihydrate.

12. A cladded substrate according to claim 1 wherein the vinyl acetate/alkene copolymer is present as a blend with a thermoplastic polyalkene.

13. A cladded substrate according to claim 1 wherein the vinyl acetate/alkene copolymer is present as a blend with an alkene/alkene copolymer.

14. A cladded substrate according to claim 13 wherein the vinyl acetate/alkene copolymer is present as a blend with a polyethylene or an ethylene/$C_3$–$C_{12}$ alkene copolymer.

15. A cladded substrate according to claim 14 wherein the vinyl acetate/alkene copolymer is present as a blend with a linear ethylene/$C_3$–$C_{12}$ alkene copolymer having a density in the range 0.910 to 0.940 gm/cm$^3$ at 25° C.

16. A cladded substrate according to claim 1 wherein the weight ratio of vinyl acetate/alkene copolymer to the other polymer(s) of the blend is in the range 1:0.2 to 4.

17. A cladded substrate according to claim 16 wherein the weight ratio of vinyl acetate/alkene copolymer to the other polymer(s) of the blend is in the range 1:0.2 to 1.5.

18. A cladded substrate according to claim 1 wherein the overall amount of vinyl acetate in the blend is at least 30 weight percent.

19. A cladded substrate according to claim 1 wherein the polymeric composition of the cladding incorporates a coupling agent.

20. A flame retarded cladding as defined in claim 1 wherein at least part of the surface which is to contact the substrate is coated with sealant or adhesive.

21. A flame retarded cladding according to claim 20 wherein the coating is a hot-melt adhesive.

22. A flame retarded halogen-free polymeric composition which comprises a substantially cross-linked blend of vinyl acetate/alkene copolymer with a thermoplastic polyalkene or an alkene/alkene copolymer and incorporates an effective amount of a halogen-free inorganic flame retardant which releases water on heating when subjected to the conditions of ASTM-D-2863, the blend having an overall vinyl acetate content of at least 18 weight percent when the blend contains less than 66 weight percent vinyl acetate/alkene copolymer, and when the blend comprises at least 66 weight percent of vinyl acetate/alkene copolymer, this copolymer has a vinyl acetate content of greater than 40 weight percent.

23. A composition according to claim 22 wherein the blend component is a polyethylene or an ethylene/$C_3$–$C_{12}$ alkene copolymer.

24. A composition according to claim 23 wherein the blend component is a ethylene/$C_3$–$C_{12}$ alkene copolymer having a density in the range 0.910 to 0.940 gm/cm$^3$ at 25° C.

25. A composition according to claim 22 wherein the weight ratio of vinyl acetate/alkene copolymer to polyalkene or alkene/alkene copolymer in the blend is in the range 1:0.2 to 4.

26. A composition according to claim 22 wherein the weight ratio of vinyl acetate/alkene copolymer to polyalkene or alkene/alkene copolymer in the blend is in the range 1:0.2 to 1.5.

27. A composition according to claim 20 wherein the overall amount of vinyl acetate in the blend is at least 30 weight percent.

28. Heat-recoverable flame retarded cladding formed from the compositions as claimed in claim 20.

29. A heat-recoverable flame retarded cladding according to claim 28 wherein the weight ratio of vinyl acetate/alkene copolymer to thermoplastic polymer is in the range 1:0.2 to 0.55.

30. An elongate substrate provided, over at least a part thereof, with a flame retarded cladding, said cladding being formed from a halogen-free polymeric composition which comprises a substantially cross-linked blend of a vinyl acetate/alkene copolymer with a styrene/butadiene rubber, or a thermoplastic polyalkene or alkene/alkene copolymer and incorporates an effective amount of a halogen-free inorganic flame retardant which releases water on heating when subjected to the conditions of ASTM- D-2863, with the provisos that:
  (i) when the vinyl acetate/alkene copolymer is blended with a styrene/butadiene rubber, the vinyl acetate/alkene copolymer has a vinyl acetate content of greater than 55 weight percent, or
  (ii) when the vinyl acetate/alkene copolymer is blended with a thermoplastic polyalkene or alkene/alkene copolymer and the blend contains less than 66 weight percent vinyl acetate/alkene copolymer, the blend has an overall vinyl acetate content of at least 30 weight percent, or
  (iii) when the vinyl acetate/alkene copolymer is blended with a thermoplastic polyalkene or alkene/alkene copolymer and the blend contains at least 66 weight percent vinyl acetate/alkene copolymer then the vinyl acetate/alkene copolymer has a vinyl acetate content of greater than 40 weight percent.

* * * * *